Figure 1:
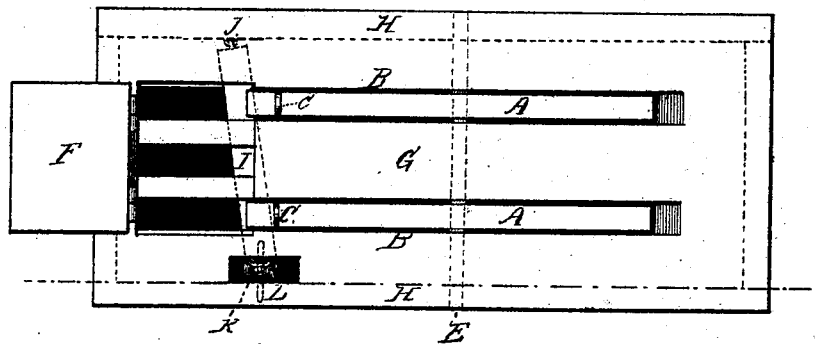
Figure 2:
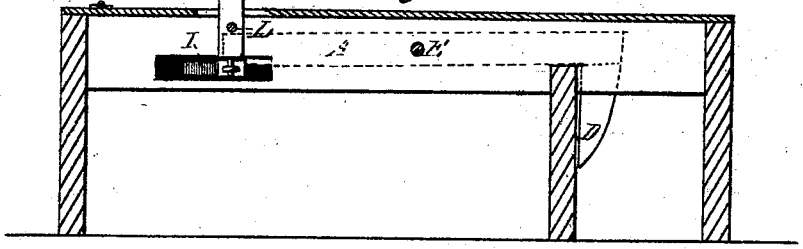

JOHN SYPES.

Improvement in Mode of Dumping Grain.

No. 119,799.    Patented Oct. 10, 1871.

Witnesses
O. J. Avery
E. P. Rowley

Inventor.
John Sypes

UNITED STATES PATENT OFFICE.

JOHN SYPES, OF FAIRBURY, ILLINOIS.

IMPROVEMENT IN MODES OF DUMPING GRAIN.

Specification forming part of Letters Patent No. 119,799, dated October 10, 1871.

*To all whom it may concern:*

Be it known that I, JOHN SYPES, of Fairbury, in the State of Illinois, have invented a new and Improved Method of Dumping Grain in Warehouses and Elevators; and I do hereby declare that the following is a full and exact description thereof, reference being had to the accompanying drawing and to the letters of reference marked thereon.

The nature of my invention consists in the construction of a floor or driveway with the proper appliances for unloading grain from wagons by dumping the same by a single movement of a lever.

To enable others to make and use my invention I will proceed to describe its construction and operation.

I first construct a floor or driveway, as shown at G in the accompanying drawing, upon which the wagon is drawn. Upon the outer edges of said floor are the two grooves B B, into which I insert the two rails A A, in one end of which are fastened the two safety-wedges D D to prevent the animals from getting their feet through the floor, and in the other end of said rails I insert two plugs or stops, C C, to prevent the wagon from moving backward. I then insert the axle E, said axle passing through the rails A A and entering timbers H H. I also construct the trap-door F, which, being raised, admits the grain to fall into a bin beneath. I then construct the lock I fastened with the clevis-bolt J. I then attach the lever K, rendered adjustable at the point L by an iron pin. By pulling the lever K the lock I is withdrawn from beneath the ends of the rails A A, thereby causing the ends of said rails to drop down, thus leaving the loaded wagon in the position of an inclined plane, and by taking out the tail-board of the wagon the grain glides out through the trap-door into the bin beneath.

What I claim as my invention, and desire to secure by Letters Patent, is—

The peculiar construction and application for the purposes intended, the driveway G, the grooves B B, the rails A A, the safety-wedges D D, the stops C C, the trap-door F, the lock I, and the lever K, with its attachment.

JOHN SYPES.

Witnesses:
O. F. AVERY,
E. P. ROWLEY.